(12) United States Patent
Williams et al.

(10) Patent No.: US 9,916,069 B2
(45) Date of Patent: Mar. 13, 2018

(54) USER INTERFACE WITH DYNAMIC TRANSITION TIMES

(71) Applicant: MICROSOFT TECHNOLOGY LICENSING, LLC, Redmond, WA (US)

(72) Inventors: Todd Matthew Williams, Sammamish, WA (US); Jason W. Renfroe, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 395 days.

(21) Appl. No.: 14/477,621

(22) Filed: Sep. 4, 2014

(65) Prior Publication Data

US 2016/0070440 A1   Mar. 10, 2016

(51) Int. Cl.
*G06F 9/44* (2006.01)
*G06F 3/0484* (2013.01)
*G06F 3/0482* (2013.01)
*G06F 3/038* (2013.01)
*G06F 3/048* (2013.01)

(52) U.S. Cl.
CPC .......... *G06F 3/04842* (2013.01); *G06F 3/038* (2013.01); *G06F 3/048* (2013.01); *G06F 3/0482* (2013.01); *G06F 9/4443* (2013.01)

(58) Field of Classification Search
CPC .... G06F 3/04842; G06F 3/0482; G06F 3/048; G06F 3/038; G06F 9/4443
See application file for complete search history.

(56) References Cited

U.S. PATENT DOCUMENTS

| 7,173,623 | B2 | 2/2007 | Calkins et al. |
| 8,127,246 | B2 | 2/2012 | Furches et al. |
| 8,471,857 | B1 | 6/2013 | Moore |
| 8,589,815 | B2 | 11/2013 | Fong et al. |
| 2008/0163086 | A1 | 7/2008 | Foxenland |
| 2012/0139924 | A1 | 6/2012 | Oldengott et al. |
| 2013/0227470 | A1 | 8/2013 | Thorsander et al. |
| 2014/0111523 | A1 | 4/2014 | Scholler |
| 2014/0157193 | A1 | 6/2014 | Moore |

FOREIGN PATENT DOCUMENTS

EP    2690537 A1    1/2014

OTHER PUBLICATIONS

ISA European Patent Office, International Search Report and Written Opinion Issued in Application No. PCT/US2015/048005, dated Nov. 23, 2015, WIPO, 11 pages.

(Continued)

*Primary Examiner* — Sara England
(74) *Attorney, Agent, or Firm* — Alleman Hall Creasman & Tuttle LLP

(57) ABSTRACT

An adaptive user interface of a computing device receives a user input triggering an animation in the user interface. The animation is configured to progress from an animation start to an animation finish in a transition time dynamically selected from a range of possible transition times based on a duration between the user input triggering the animation and an immediately previous user input. The animation is presented with the dynamically selected transition time.

20 Claims, 6 Drawing Sheets

(56) References Cited

OTHER PUBLICATIONS

Lowe, Richard., "User-Controllable Animated Diagrams: The Solution for Learning Dynamic Content?", In Proceedings of Third International Conference on Diagrammatic Representation and Inference, vol. 2980, Mar. 22, 2004, 4 pages.

IPEA European Patent Office, Second Written Opinion Issued in PCT Applicaiton No. PCT/US2015/048005, dated Aug. 12, 2016, WIPO, 7 pages.

IPEA European Patent Office, International Preliminary Report on Patentability Issued in PCR Application No. PCT/US2015/048005, dated Nov. 24, 2016, WIPO, 8 pages.

USER INTERFACE WITH DYNAMIC TRANSITION TIMES

BACKGROUND

Computing devices may be configured to provide a user interface to allow a user to interact and provide input to the computing device. Some user interfaces have animations characterized by a transition time from the beginning of the animation to an end of the animation.

SUMMARY

The present disclosure describes an adaptive user interface that enables dynamic selection of animation durations responsive to user behavior and/or other parameters. In some examples, a method for providing an adaptive user interface of a computing device includes receiving a user input triggering an animation in the user interface, the animation configured to progress from an animation start to an animation finish in a transition time dynamically selected from a range of possible transition times based on a duration between the user input triggering the animation and an immediately previous user input. The example method further includes presenting the animation with the dynamically selected transition time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

User interfaces may be configured to provide animated transitions as a user interacts with the interface. For example, after a menu item is selected, the user interface may control a display of a computing device to present an animation in which the selected menu item fades out of view and additional menu items and/or other user interface elements fade into view. As a user becomes familiar with the user interface, selections of menu items and other user interface elements may occur more quickly. Utilization of static animation durations may cause errors or user frustration if the user interface is prevented from responding to user input during presentation of the animation. Errors or frustration may additionally or alternatively arise if the user interface allows user input during presentation of the animation, causing increasingly delayed visual responses to the inputs and/or losses in functionality as the system is not able to keep up with the user inputs.

Adaptively selecting an animation transition time enables a user interface to react to user input characteristics and other contextual parameters. In this way, the computing system may provide smooth and stable transitions between pages, menus, and other changeable display items of the user interface responsive to user input.

Figure 1:
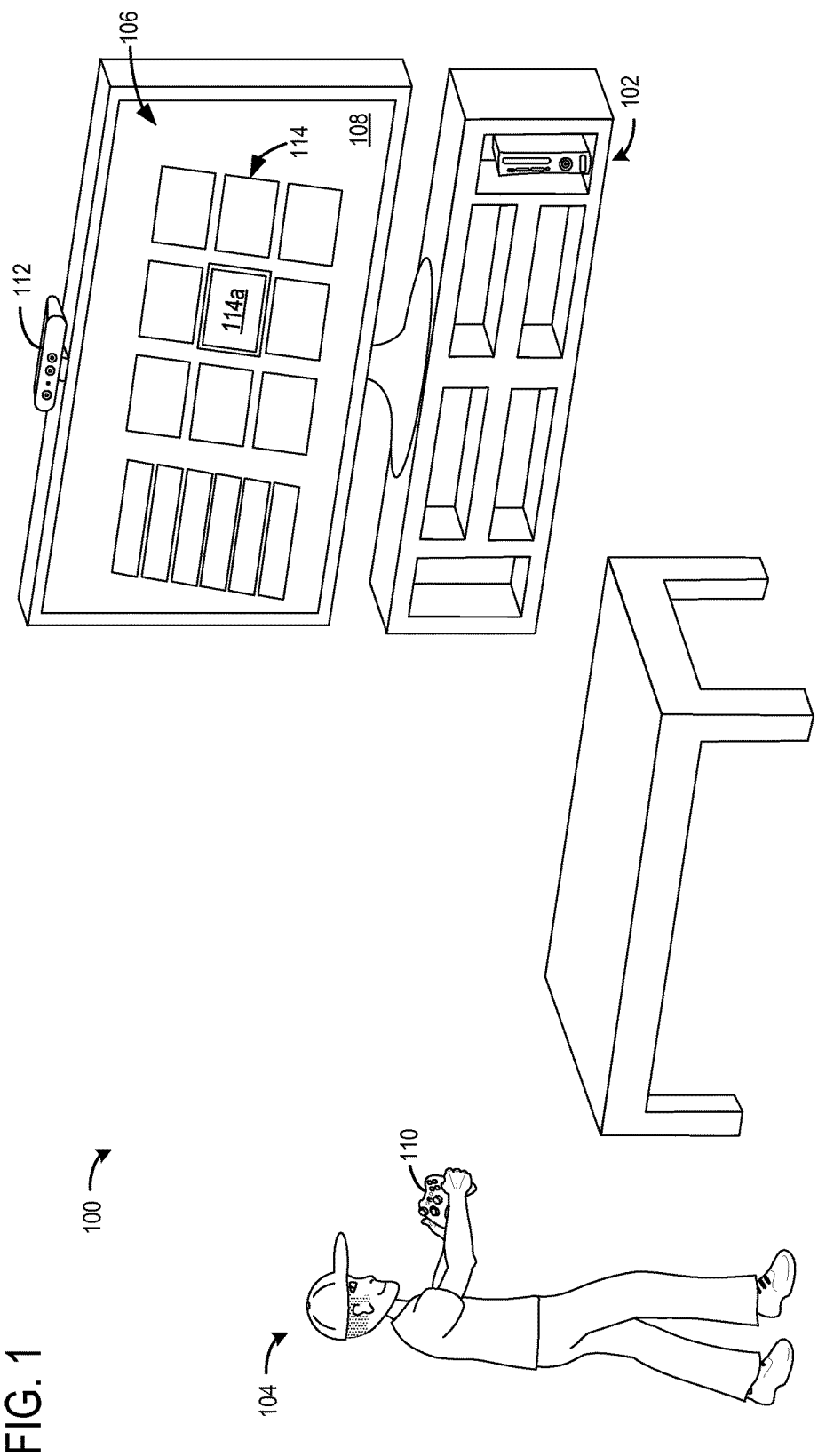
FIG. 1 shows an example environment in which a computing system may receive user input to interact with a user interface of the computing system.

FIG. 1 shows an example environment 100 in which a computing system 102 may receive user input from a user 104 to allow interaction with a user interface 106 of the computing system. In the illustrated embodiment, user interface 106 is presented on a display device 108 that is communicatively coupled to computing system 102. User 104 may provide input to the computing system to interact with user interface 106 via input provided to control device 110 (e.g., button actuation, touch input, joystick operation, motion input, etc.), via voice command received by one or more microphones of sensor device 112, via gesture input received by one or more imaging devices of sensor device 112, and/or via any other suitable input mechanism. Although illustrated as a gaming console in FIG. 1, it is to be understood that computing system 102 may additionally or alternatively include a personal computer, tablet, smartphone, laptop, server computing system, portable computing system, and/or any other suitable computing system. Likewise, display device 108 is illustrated as a television or monitor device, however any other suitable display device may be configured to present user interface 106, such as integrated display devices on portable computing devices.

User interface 106 may include one or more selectable user interface elements 114, which may include menu items, executable files, hyperlinks, and/or any other suitable interactive element. As illustrated, user interface element 114a may be highlighted or otherwise designated as selectable upon providing input to computing system 102. Upon confirmation of the selection of user interface element 114a, one or more additional or alternative displayable elements may be presented. For example, user interface element 114a and the eight user interface elements surrounding element 114a may be removed and replaced with a single user interface element or other displayable element(s) that particularly corresponds to user interface element 114a.

Additional menus, videos/images, operating system elements (e.g., pages/windows), application windows, and/or other suitable displayable elements may be presented after displaying an animation transitioning from the displayable elements present immediately prior to the user input and the displayable elements to be presented responsive to the user input. The animation may include one or more transition effects, such as wipe effects, dissolve/fade effects, cut effects, zoom/motion effects, and/or other suitable effects. Such effects may selectively remove/move portions of current displayable elements (e.g., all current displayable elements or just the current displayable elements that are to be changed responsive to the user input) and present portions of new displayable elements that are to be displayed responsive to the user input over a transition time.

Figure 2:
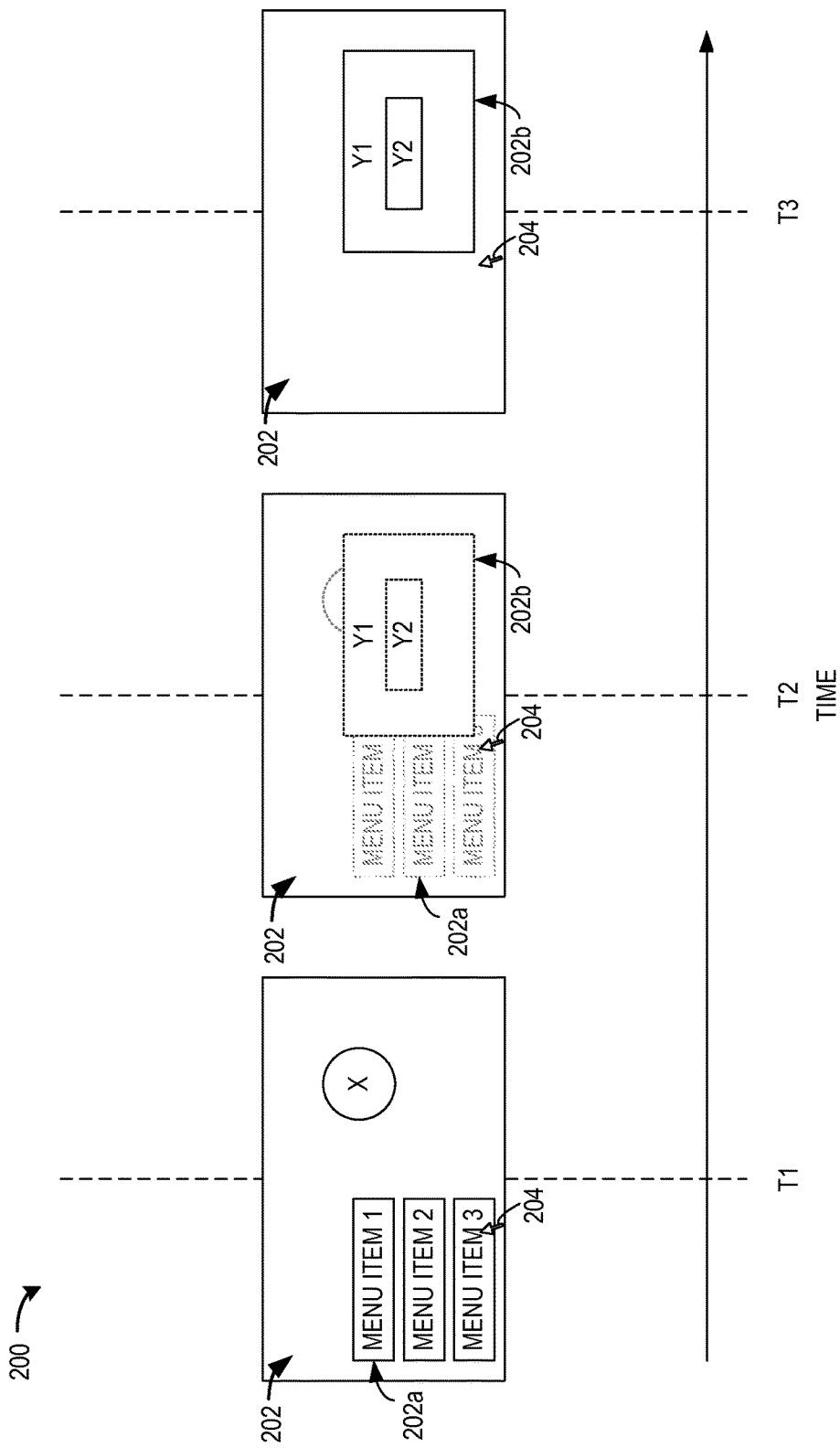
FIG. 2 shows an example timeline of a visual response to user selection of a menu item of a user interface.

An example of a user interface transition is illustrated in FIG. 2. Timeline 200 shows the state of an example simplified user interface 202 at various points in time. For example, user interface 202 may be presented by computing system 102 of FIG. 1 via display 108 of FIG. 1. At time T1, a first set of user interface items 202a may be presented in the user interface. The first set of user interface items 202a may correspond to a menu (e.g., including menu items 1-3) and a displayable element (e.g., circle X). As illustrated, a cursor 204 may indicate an item that is to be selected responsive to further user input (e.g., a mouse click, a button press, a voice input, a gesture, and/or any other suitable input mechanism). Such further user input selecting menu item 3 may be received at some time between time T1 and T2, resulting in an animation start. The state of the user interface 202 at time T2 may illustrate the appearance of the user interface (e.g., a frame of the animation, a time-based state of the animation/transition, etc.) at some time between the animation start and an animation finish. As illustrated, the first set of user interface items 202a may still be viewable, but may be fading out and/or otherwise be in the process of being removed from the items displayed in the user interface. A second set of user interface items 202b (e.g., boxes Y1 and Y2) may be fading in and/or otherwise be in the process of being added as items that are displayed in the user interface. Accordingly, both a first set of items (e.g., an initial set of displayable items) and a second set of items (e.g., a new set of displayable items to be displayed responsive to user input) may be at least partially viewable at time T2 during the animation. It is to be understood that in some embodiments, a transition may result in the first set of items being completely removed (e.g., faded out until not viewable) before the second set of items are added (e.g., faded in until fully viewable). Furthermore, fading is only an example, and items may be moved on or off the display via other suitable transitions, such as translation.

At time T3 (or at some time between time T2 and T3), the animation may be finished, resulting in the full display of the second set of displayable items 202b. The progression from animation start (e.g., some time between times T1 and T2) to animation finish (e.g., some time between times T2 and T3) may define the animation transition time. For inexperienced users, a relatively long transition time may reduce the likelihood of overwhelming the user, as such a transition time reduces jarring changes in the display and allows the user to view a selected item and the results of selecting the item. Conversely, for experienced users, relatively long transition times may lead to frustration, as the user may be prevented from quickly navigating nested menus and/or switching between different pages/displayable elements during the transition time and/or before a new interactive element is available for user input. It is to be understood that the animations described above are exemplary in nature and any suitable animation and/or transition in the user interface may be displayed for a selected transition time, as described in more detail with respect to FIGS. 3 and 4.

Figure 3:
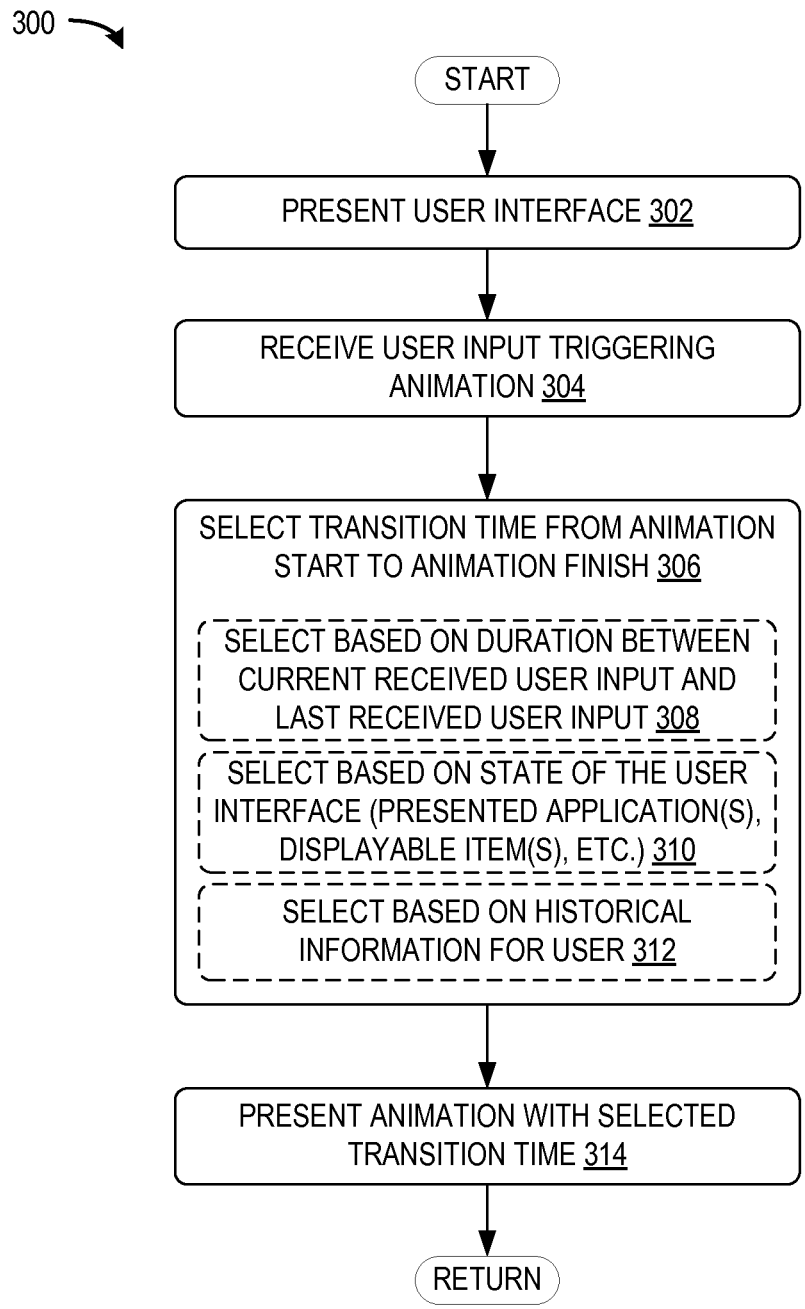
FIG. 3 is a flow chart of an example method for providing an adaptive user interface.

FIG. 3 is a flow chart of an example method 300 for providing an adaptive user interface. For example, method 300 may be performed via computing system 102 of FIG. 1. At 302, method 300 includes presenting a user interface. For example, the user interface may be presented in a first state, with a first set of displayable items, one or more of which may be selectable. At 304, method 300 includes receiving user input triggering animation. For example, user input triggering animation may include user selection of a menu item (e.g., triggering the appearance of a next menu item or other displayable element, triggering the collapse of one or more menus, etc.), selection of a file (e.g., triggering the opening of the file and/or an application for opening the file), selection of a hyperlink (e.g., triggering the opening of a browser and/or a web page within a browser), and/or any other suitable user input that may cause a change in the items displayed within the user interface. A transition time of the animation may refer to the length of the animation (e.g., how long it takes for a selected drop down menu to "drop down," how long it takes for a selected photo to expand from a thumbnail, how long it takes for an application window to be displayed/loaded, etc.). In some examples, the transition time (e.g., described as being selectable/adjustable below) may exclude data transfer times (e.g., the amount of time taken to retrieve content, such as user interface elements/animations, from a remote device via a network and/or from a local storage device via a bus or other internal data transfer connection). In other words, if data needs to be accessed to complete the transition, the total transition time effectively may be constrained by the data transmission time. However, data may be predictively buffered so as to limit any perceived slowdown due to data access.

At 306, method 300 includes selecting a transition time from animation start to animation finish. As indicated at 308, the selection of the transition time may be based on a duration between a currently received user input (e.g., the user input triggering the animation at 304) and a last received user input (e.g., the immediately prior qualifying user input that resulted in an animation or otherwise provided control to the computing system). The transition time may additionally or alternatively be selected based on a state of the user interface (e.g., applications presented in the user interface/applications to which user input is applied, displayable items of the user interface, etc.), as indicated at 310, and/or historical information for the user (e.g., all or a subset of collected interactions, mouse movements, body movements, etc. over a period of time), as indicated at 312. Further details regarding the selection of the transition time are described below with respect to FIG. 4.

At 314, the method includes presenting the animation with the selected transition time. In other words, the duration of the animation is dynamically changeable based on how quickly the user is providing input to the computing system. If the user is providing input very quickly, the duration of the animation may be shortened so that the user interface appears very responsive to the user. On the other hand, if the user is taking lots of time between inputs, the duration of the animation may be lengthened so that the animations appear richer and are easier to follow.

It is to be understood that one or more values, such as the time at which the user input was received at 304 and the selected transition time may be recorded in memory and/or otherwise stored for later retrieval during future transition time selections.

Figure 4:
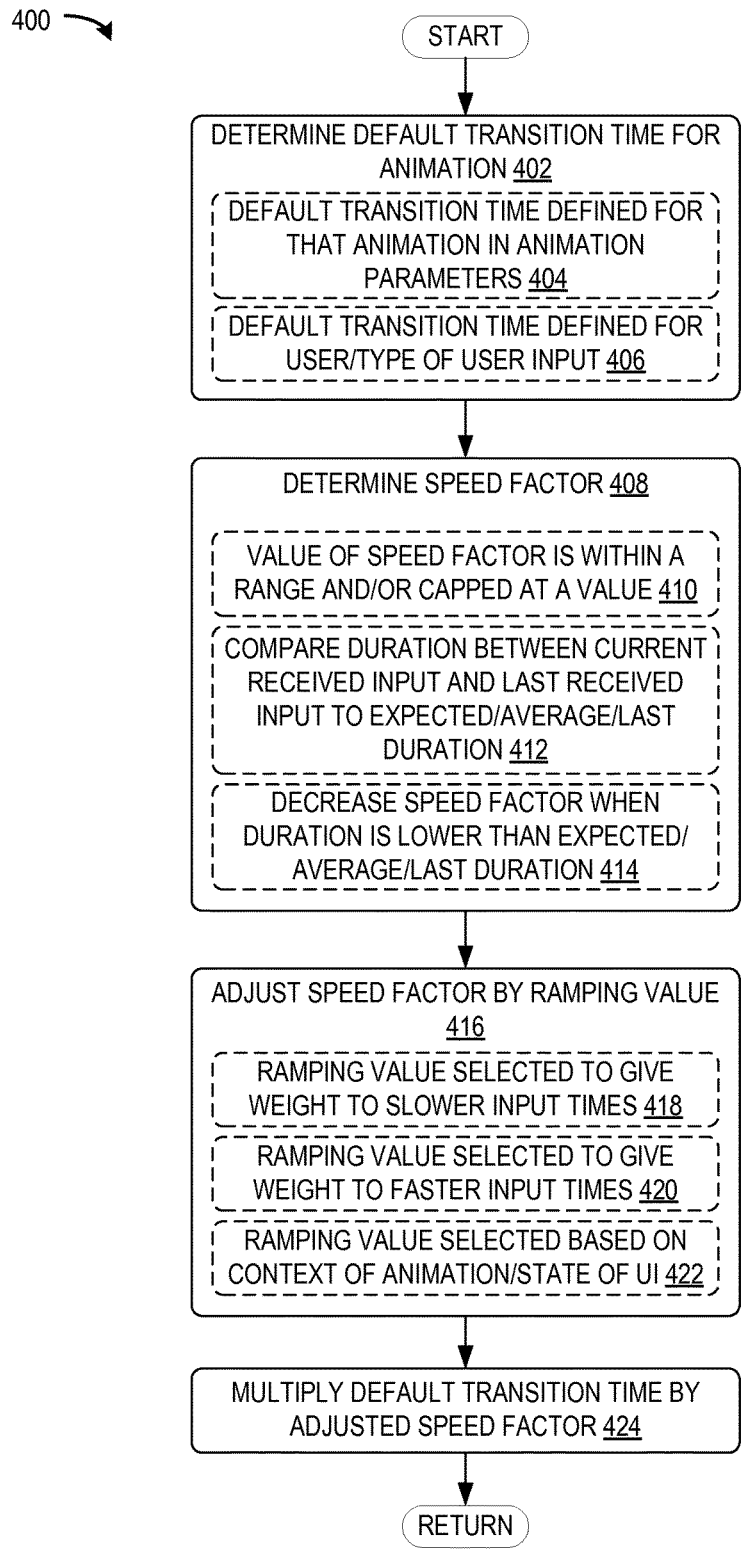
FIG. 4 is a flow chart of an example method for selecting an animation transition time.

FIG. 4 is a flow chart of an example method 400 for selecting an animation transition time. For example, method 400 may be performed by computing system 102 in FIG. 1 during method 300 (e.g., at 306) of FIG. 3. At 402, method 400 includes determining a default transition time for the animation. The default transition time may be defined and/or specified for that animation (e.g., the animation triggered at 304 of FIG. 3) in animation data/parameters for that animation, as indicated at 404. For example, the default transition time may be included in a data field that is accessed during execution of the animation. In other examples, the default transition time may be defined for all animations in the user interface and/or stored in a single location that is referenced in the animation data for each animation in the user interface.

The default transition time may additionally or alternatively be defined for a specific user and/or a type of user interaction/input (e.g., based on the user input device and/or receiver), as indicated at 406. For example, upon triggering the animation, the default transition time may be selected based on a user identity of the user providing the input that triggered the animation and/or based on the type of user input that triggered the animation (e.g., touch vs. voice). Default transition times defined in this manner may be selected based on historical data for user input provided by each user/type of user device, calibration data received for that user/type of user device (e.g., based only on data gathered during a dedicated calibration routine), user selection, predefined parameters, and/or any other suitable factors.

At 408, method 400 includes determining a speed factor. The speed factor may represent an animation speed percentage and may be utilized to determine a dynamically selected transition time that is a percentage of the default transition time. In some examples, the transition time for an animation may be capped at the default transition time, or another suitable value, as indicated at 410. As one example, the value of the speed factor may be within a range of 0 to 1. In other examples, the speed factor may be capped at different values and/or include a different range of values. In still other examples, there may not be a default transition time per se, and the speed factor will itself provide the actual dynamic transition time.

As indicated at 412, the speed factor may be determined and/or otherwise calculated by comparing the duration between a currently received input and a last received input (e.g., a last received input that triggered an animation) to an expected, average, last, and/or other threshold duration that is stored locally or remotely from the computing system. For example, an expected duration may be a predefined/stored value based on a type of input being provided, features of the user interface, and/or any other suitable criteria.

The speed factor may be configured to decrease (e.g., to result in a smaller transition time for a presented animation) when the duration is lower than the expected, average, last, and/or other threshold duration, as indicated at 414. Such a relatively lower duration may indicate that a user is providing input to the system at a relatively faster rate than expected/average/previously observed/defined by a threshold. Accordingly, increasing the speed factor responsive to such relatively faster input rates may dynamically adjust the user interface response to the user input to react to the user behavior. An example function (1) to derive a speed factor as described above includes:

$$S_{cur}=S_{last}+((t/e)-1), \quad (1)$$

where $S_{cur}$ is the speed factor to be used for a current animation, $S_{last}$ is the speed factor used in an immediately prior animation, t is the duration between the current user input that triggered the current animation and the last user input that triggered the immediately prior animation, and e is the expected, average, last, and/or other threshold duration between inputs. In some examples, t may be selected to be the minimum of some factor of the expected and/or threshold duration and the observed duration between inputs (e.g., twice the expected duration) in order to cap the duration to a particular value. It is to be understood that function (1) is exemplary, and any suitable function for deriving a speed factor may be utilized. For example, functions that enable a speed factor to be derived from a collection and/or average of input speeds over time may be utilized. Functions that do not step up/down may also be utilized.

As indicated at 416, method 400 may include adjusting the speed factor by a ramping value. For example, the ramping value may be utilized to determine dynamically selected incremental values by which the speed factor may be increased or decreased (e.g., how many increments exist between 0 and 1 and/or the relative spacing between such increments). Such increments may be dynamically selected according to any linear or nonlinear equation or other suitable selection algorithm. A higher ramp may create more increments and smoother transitions between multiple sequential animations than a lower ramp. Such an adjustment may be represented by the following equation:

$$S_{cur}=S_{last}+((t/e)-1)/r, \quad (2)$$

where r is the ramping value. As indicated at 418, the ramping value may be selected to give weight to slower input times. With such a selection of the ramping value, the speed factor may only be reduced when highly fast paced input events (or a high number of fast paced input events) are received. In contrast, the speed factor may be increased when slow paced or moderately slow paced events (or a low number of slow paced events) are received. In such an example, the speed factor may increase more quickly than the speed factor decreases, creating an elastic effect. Alternatively, as indicated at 420, the ramping value may be selected to give weight to faster input times, allowing the speed factor to decrease more quickly than the speed factor increases to create a floating effect (e.g., in response to multiple short durations between user inputs followed by multiple long durations between user inputs, the animation speed "floats" at relatively fast speeds before being significantly decreased).

The ramping value may be selected based on the context of the animations and/or the state of the user interface, as indicated at 422. For example, when a user pauses to read or view a screen in the user interface, the ramping value may be selected to ensure that the change in animation times is not jarring when the user returns to fast input times. To this end, the ramping value may be selected based on an amount of newly-presented information that is displayed after the user input, which may be indicative of a high likelihood that the user is temporarily pausing to view the new information, rather than beginning a long string of slow user inputs. In some examples, user inputs that do not trigger an animation may be utilized to adjust the speed factor. For example, user input that does not trigger an animation or otherwise result in changes at the computing system may be determined to be received due to user error and be indicative of user frustration or improper interaction with the system. Accordingly, detection of such input that does not trigger an animation may be factored into the ramping value selection to slow down the animation times. At 424, method 400 includes multiplying the default transition time by the adjusted speed factor (e.g., the speed factor as adjusted by the ramping value).

Figure 5:
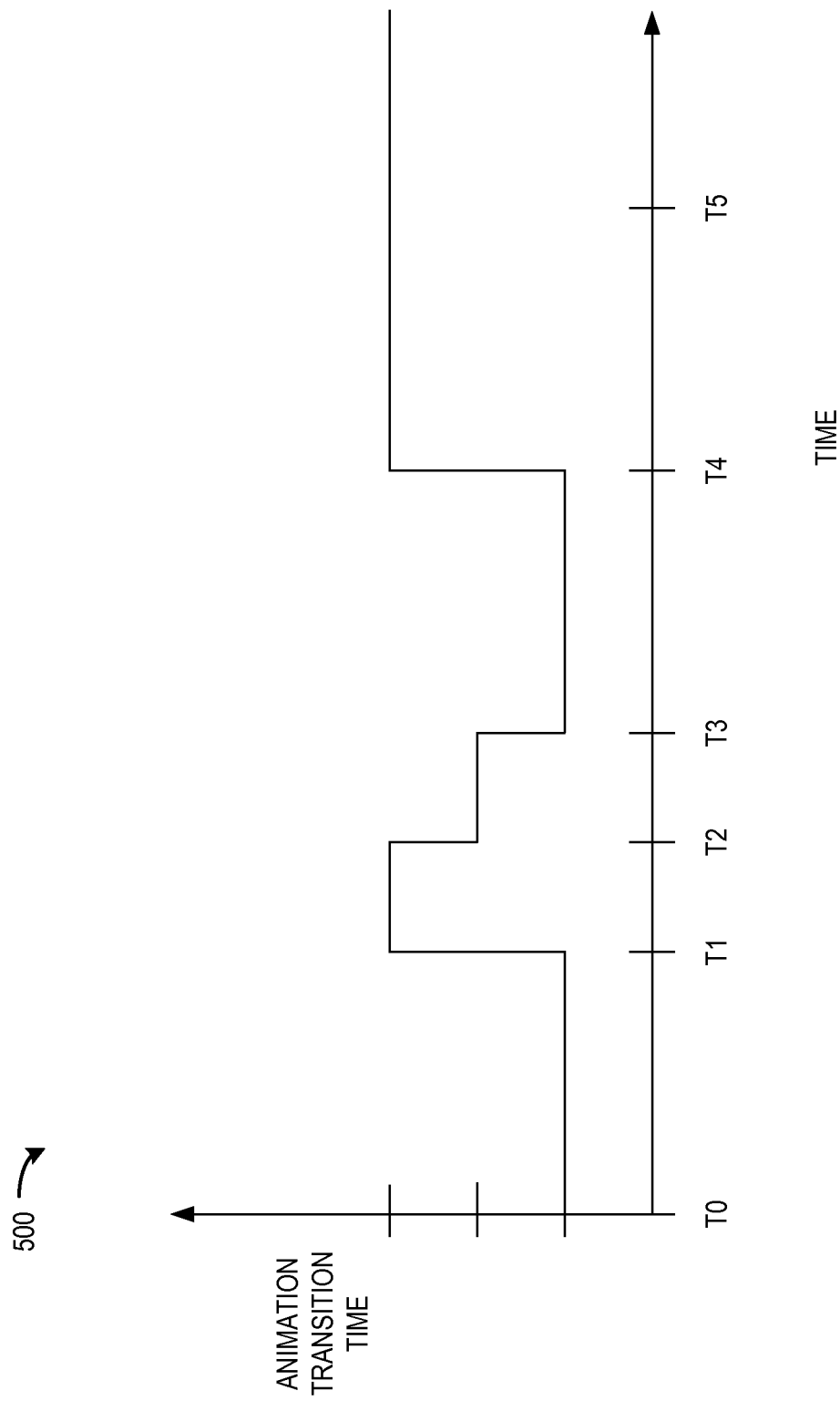
FIG. 5 shows an example graph of dynamically selected animation transition times.

FIG. 5 shows an example graph 500 of dynamically selected animation transition times. In the example illustrated in FIG. 5, a ramping value may be selected that weighs increasing user input durations more heavily than decreasing user input durations. At time T0, a user input triggering an animation may be received. If no prior qualifying user input was received (e.g., during a particular session), the animation transition time may be a default or predefined value. At time T1, a user input triggering an animation may be received, the duration between that user input and the last received user input at time T0 being slower than an expected (or other threshold) duration. As a result, the animation transition time may be increased from the last animation transition time (e.g., to twice the last animation transition time).

At time T2, a user input triggering an animation may be received, the duration between T1 and T2 being faster than an expected (or other threshold) duration. As a result, the animation transition time may be decreased from the last animation transition time. However, as illustrated, the amount that the animation transition time is decreased may be less than the amount that the animation transition time was increased at time T1 due to the ramping value. At time T3, a user input triggering an animation may be received, the duration between T2 and T3 being faster than an expected (or other threshold duration). As a result, the animation transition time may be decreased from the last animation transition time (e.g., by the same amount as the decrease at time T2).

At time T4, a user input triggering an animation may be received, the duration between T3 and T4 being longer than an expected (or other threshold) duration. As a result, the animation transition time may be increased from the last animation transition time (e.g., by a larger amount than the decrease at times T2 and T3). At time T5, a user input triggering an animation may be received, the duration between T4 and T5 being equal to an expected (or other threshold) duration. Accordingly, the animation transition time may remain unchanged from a last animation transition time.

It is to be understood that changing a transition time defining a length of an animated response to user input may be used in addition to other effects for affecting the apparent speed or intensity of changes to a user interface. For example, changes in a hue of on-screen elements, color saturation, camera shake effects, blurring of user interface elements and/or background elements, audio effects, vibration, temperature (e.g., for wearable devices), and/or any other suitable effects may be presented to alter the perception of user interface transitions and/or to provide feedback to user input.

By using a dynamically selected animation transition time, a user interface may present changes at a speed that corresponds to a user's input speed, an input mechanism, a state of the user interface, and/or other suitable factors. In this way, more advanced users may be able to provide input more quickly without causing errors (e.g., errors due to inputs being received before prior inputs are able to be processed) as a result of shorter animation transition times. Less advanced users may be able to view the effects of each user input due to longer animation transition times.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
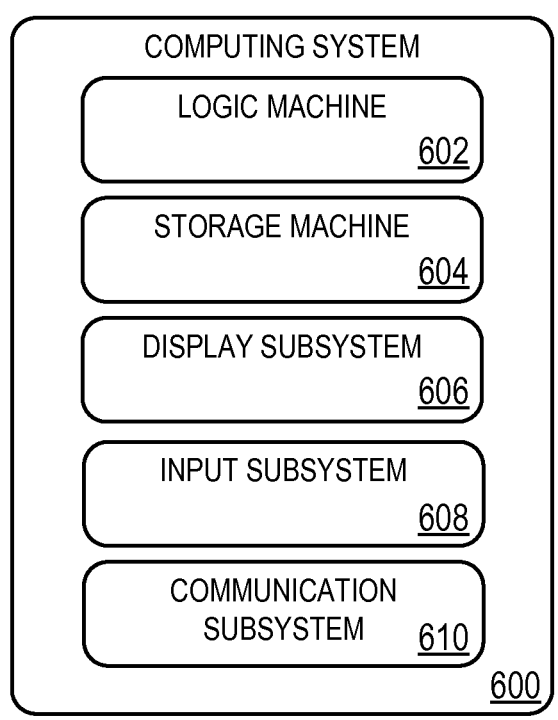
FIG. 6 is a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, wearable devices, mobile communication devices (e.g., smart phone), and/or other computing devices. For example, computing system 600 may take the form of computing system 102 of FIG. 1.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; a sensor for sensing proximity, magnetic field, heart-rate, breath, sweat, etc. to determine environmental/atmospheric/user information and/or state; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, a wired or wireless local- or wide-area network, a low power protocol (e.g., BLUETOOTH, Near Field Communication [NFC], wireless mesh, and/or any other suitable low power communication protocol). In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for providing an adaptive user interface of a computing device, the method comprising:
receiving a user input triggering an animation in the user interface, the animation configured to progress from an animation start to an animation finish in a first transition time dynamically selected from a range of possible transition times, the first transition time selected based on a duration between the user input triggering the animation and an immediately previous user input;
presenting the animation with the dynamically selected first transition time;
receiving a subsequent user input triggering the animation in the user interface, the animation configured to progress from the animation start to the animation finish in a second transition time dynamically selected from the range of possible transition times, the second transition time selected based on a duration between the subsequent user input triggering the animation and a user input immediately preceding the subsequent user input, and wherein the second transition time is greater than the first transition time.

2. The method of claim 1, wherein a dynamically selected transition time increases as the duration between the user input triggering the animation and the immediately previous user input increases.

3. The method of claim 1, further comprising comparing the duration between the user input triggering the animation and the immediately previous user input to a threshold duration, selecting a longer transition time as the first dynamically selected transition time if the duration is longer than the threshold duration, and selecting a shorter transition time as the first dynamically selected transition time if the duration is shorter than the threshold duration.

4. The method of claim 1, wherein a dynamically selected transition time includes a default transition time multiplied by a speed factor, the speed factor being calculated based on the duration between the user input triggering the animation and the immediately previous user input and the default transition time being specified in animation data for the animation.

5. The method of claim 4, wherein the speed factor for the dynamically selected transition time is increased or decreased from a last speed factor by a ramping value comprising a dynamically selected incremental amount.

6. The method of claim 5, wherein the dynamically selected incremental amount increases as the duration between the user input triggering the animation and the immediately previous user input increases.

7. The method of claim 5, wherein the dynamically selected incremental amount decreases as the duration between the user input triggering the animation and the immediately previous user input increases.

8. The method of claim 5, wherein the dynamically selected incremental amount is selected based on one or more of an application to which the user input is applied and a type of user interaction with the computing device.

9. The method of claim 4, wherein the default transition time is defined based on one or more of a user identity, a history of user input provided by a user, and a type of user input provided by the user.

10. The method of claim 1, further comprising modifying behavior of one or more other user interface elements based on a dynamically selected transition time.

11. A computing device for providing an adaptive user interface, the computing device comprising:
- a display for presenting the user interface;
- a user input interface for receiving and processing user input affecting information presented on the display;
- a logic machine; and
- a storage machine storing instructions executable by the logic machine to:
  - receive, via the user input interface, a user input triggering an animation in the user interface, the animation configured to progress from an animation start to an animation finish in a first transition time dynamically selected from a range of possible transition times, the first transition time selected based on a duration between the user input triggering the animation and an immediately previous user input;
  - present, via the display, the animation with the dynamically selected transition time;
  - receive, via the user input interface, a subsequent user input triggering the animation in the user interface, the animation configured to progress from the animation start to the animation finish in a second transition time dynamically selected from the range of possible transition times, the second transition time selected based on a duration between the subsequent user input triggering the animation and a user input immediately preceding the subsequent user input, and wherein the second transition time is greater than the first transition time.

12. The method of claim 11, wherein a dynamically selected transition time increases as the duration between the user input triggering the animation and the immediately previous user input increases.

13. The method of claim 11, further comprising comparing the duration between the user input triggering the animation and the immediately previous user input to a threshold duration, selecting a longer transition time as the first dynamically selected transition time if the duration is longer than the threshold duration, and selecting a shorter transition time as the first dynamically selected transition time if the duration is shorter than the threshold duration.

14. The method of claim 11, wherein a dynamically selected transition time includes a default transition time multiplied by a speed factor, the speed factor being calculated based on the duration between the user input triggering the animation and the immediately previous user input and the default transition time being specified in animation data for the animation.

15. The method of claim 14, wherein the speed factor for the dynamically selected transition time is increased or decreased from a last speed factor included in a last dynamically selected transition time for a last animation triggered by the immediately previous user input by a ramping value comprising a dynamically selected incremental amount.

16. The method of claim 15, wherein the dynamically selected incremental amount increases as the duration between the user input triggering the animation and the immediately previous user input increases.

17. The method of claim 15, wherein the dynamically selected incremental amount decreases as the duration between the user input triggering the animation and the immediately previous user input increases.

18. The method of claim 15, wherein the dynamically selected incremental amount is selected based on one or more of an application to which the user input is applied and a type of user interaction with the computing device.

19. The method of claim 14, wherein the default transition time is defined based on one or more of a user identity, a history of user input provided by a user, and a type of user input provided by the user.

20. A method for providing an adaptive user interface of a computing device, the method comprising:
- receiving a user input triggering an animation in the user interface, the animation configured to progress from an animation start to an animation finish in a first transition time dynamically selected from a range of possible transition times, the first transition time selected based on a ramping factor and a duration between the user input triggering the animation and an immediately previous user input;
- presenting the animation with the dynamically selected transition time;
- receiving a subsequent user input triggering the animation in the user interface, the animation configured to progress from the animation start to the animation finish in a second transition time dynamically selected from the range of possible transition times, the second transition time selected based on a ramping factor and a duration between the subsequent user input triggering the animation and a user input immediately preceding the subsequent user input, and wherein the second transition time is greater than the first transition time.

* * * * *